(12) United States Patent
Sobel

(10) Patent No.: US 9,194,094 B1
(45) Date of Patent: Nov. 24, 2015

(54) OIL COLLECTION ASSEMBLY

(76) Inventor: Carl A. Sobel, Tisbury, MA (US)

(*) Notice: Subject to any disclaimer, the term of this patent is extended or adjusted under 35 U.S.C. 154(b) by 283 days.

(21) Appl. No.: 13/484,492

(22) Filed: May 31, 2012

(51) Int. Cl.
*E02B 15/10* (2006.01)
*E02B 15/04* (2006.01)
*A47L 9/02* (2006.01)
*A47L 7/00* (2006.01)

(52) U.S. Cl.
CPC ............. *E02B 15/106* (2013.01); *A47L 7/0009* (2013.01); *A47L 9/02* (2013.01); *E02B 15/04* (2013.01); *A47L 7/0028* (2013.01)

(58) Field of Classification Search
CPC ....... E02B 15/04; E02B 15/10; E02B 15/106; A47L 7/0004; A47L 7/0009; A47L 7/0023; A47L 7/0028; A47L 9/02
USPC ............. 210/747.5, 776, 86, 95, 104, 170.09, 210/170.1, 170.11, 242.3, 416.1, 540, 923; 15/415.1, 422
See application file for complete search history.

(56) References Cited

U.S. PATENT DOCUMENTS

| | | | |
|---|---|---|---|
| 2,120,893 A * | 6/1938 | Frushour | 210/95 |
| 2,330,508 A * | 9/1943 | McColl | 210/923 |
| 2,575,768 A * | 11/1951 | Pearsall | 210/95 |
| 3,962,093 A | 6/1976 | Gibson | |
| 4,146,482 A | 3/1979 | Shyu | |
| 4,194,978 A * | 3/1980 | Crema | 210/242.3 |
| 4,277,334 A * | 7/1981 | Ruidisch et al. | 210/170.1 |
| 4,476,607 A * | 10/1984 | Ross | 15/422 |
| 4,610,788 A | 9/1986 | Ward | |
| 4,976,850 A * | 12/1990 | Kulitz | 210/416.1 |
| 5,030,342 A | 7/1991 | Ortega | |
| 5,108,591 A | 4/1992 | Hagan | |
| 5,143,629 A * | 9/1992 | Lint | 210/776 |
| 5,292,433 A | 3/1994 | Fletcher et al. | |
| 5,349,722 A * | 9/1994 | Chayer | 15/418 |
| 5,503,753 A * | 4/1996 | Woodall et al. | 210/532.1 |
| 5,980,737 A * | 11/1999 | Rajewski | 210/104 |
| 6,125,502 A * | 10/2000 | Hammeken et al. | 15/415.1 |
| 7,465,392 B1 * | 12/2008 | Wang | 210/170.09 |
| 2002/0161272 A1 | 10/2002 | Michel, Jr. | |

* cited by examiner

*Primary Examiner* — Christopher Upton

(57) ABSTRACT

An oil collection assembly is provided for skimming oil from water. The assembly includes a vacuum having a suction port. A hose has a first end and a second end. The first end of the hose is coupled to the suction port. A nozzle has a first end and a second end. The first end of the nozzle is coupled to the second end of the hose. A bowl is coupled to the nozzle. The bowl has a perimeter wall extending around the second end of the nozzle. The second end of the nozzle is positioned adjacent to an interior surface of the perimeter wall of the bowl. A top edge of the perimeter wall of the bowl is positioned in vertically spaced relationship to the second end of the nozzle whereby the vacuum is configured for sucking contents of the bowl into the second end of the nozzle.

12 Claims, 4 Drawing Sheets

OIL COLLECTION ASSEMBLY

BACKGROUND OF THE DISCLOSURE

Field of the Disclosure

The disclosure relates to oil collection devices and more particularly pertains to a new oil collection device for skimming and collecting oil from the surface of water.

SUMMARY OF THE DISCLOSURE

An embodiment of the disclosure meets the needs presented above by generally comprising a vacuum having a suction port. A hose has a first end and a second end. The first end of the hose is coupled to the suction port. A nozzle has a first end and a second end. The first end of the nozzle is coupled to the second end of the hose. A bowl is coupled to the nozzle. The bowl has a perimeter wall extending around the second end of the nozzle. The second end of the nozzle is positioned adjacent to an interior surface of the perimeter wall of the bowl. A top edge of the perimeter wall of the bowl is positioned in vertically spaced relationship to the second end of the nozzle whereby the vacuum is configured for sucking contents of the bowl into the second end of the nozzle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
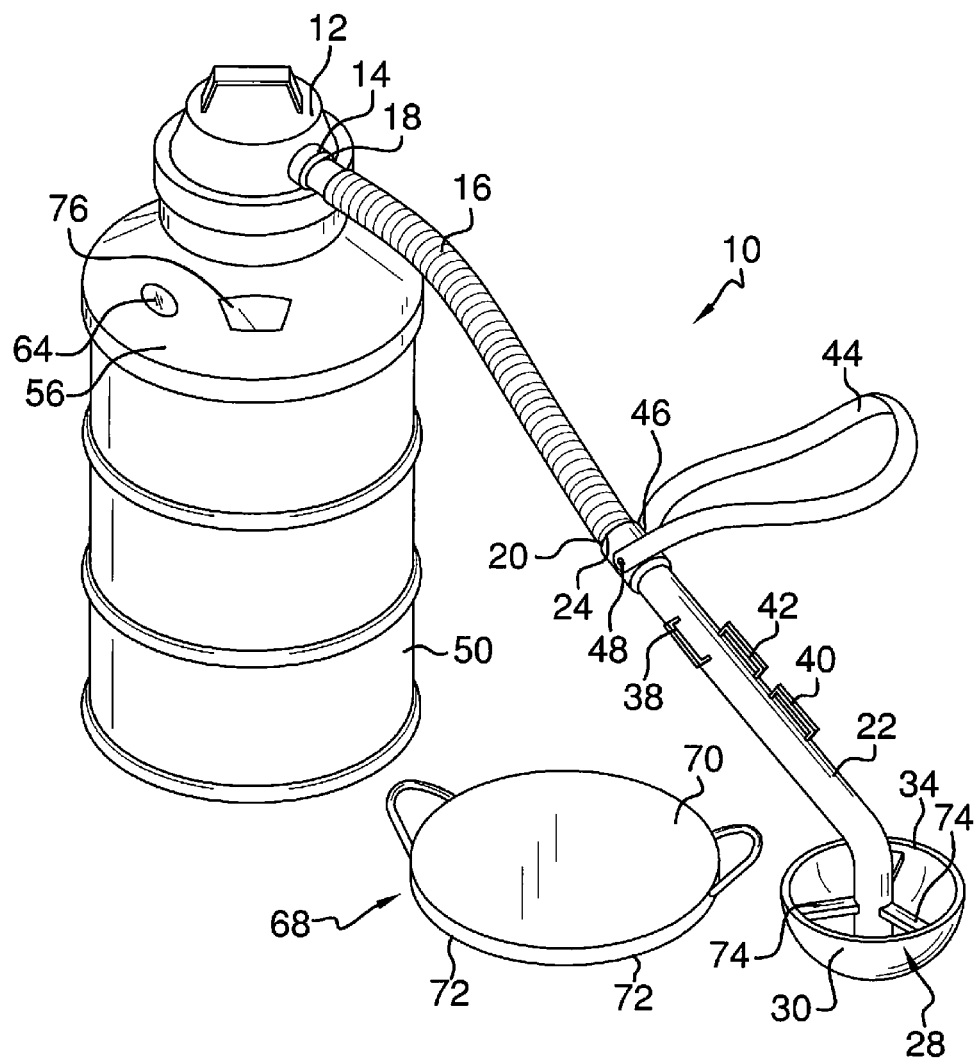
FIG. 1 is a top front side perspective view of a oil collection assembly according to an embodiment of the disclosure.
Figure 2:
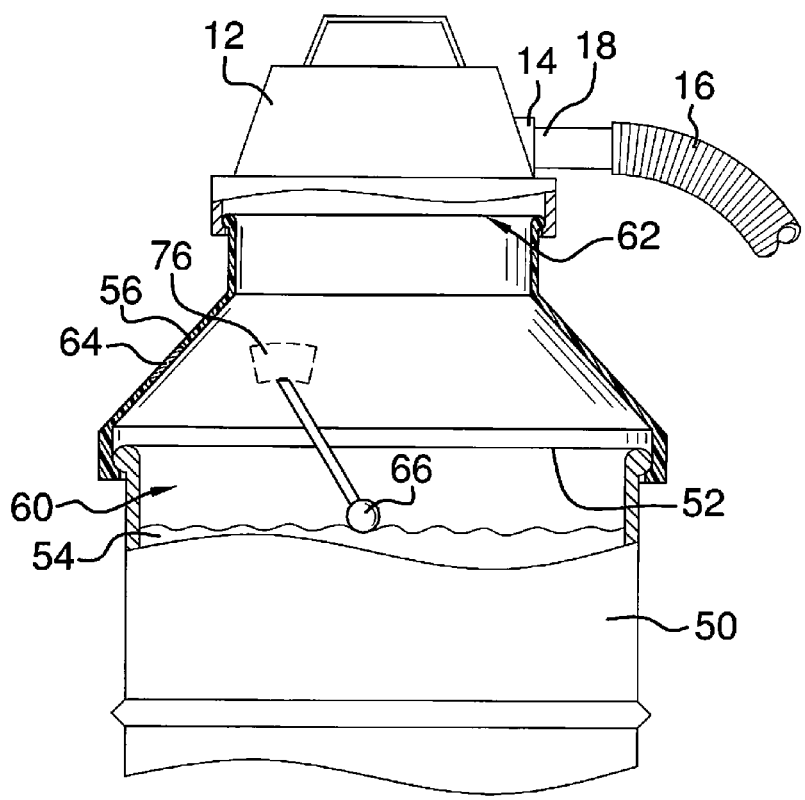
FIG. 2 is a partial cut-away side view of an embodiment of the disclosure.
Figure 4:
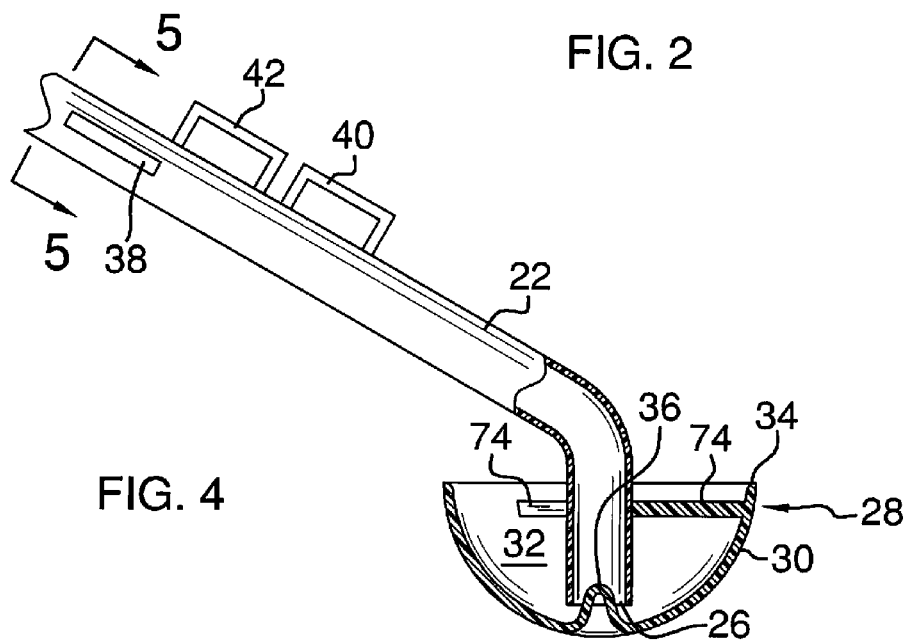
FIG. 4 is a cross-sectional view of an embodiment of the disclosure taken along line 4-4 of FIG. 3.
Figure 3:
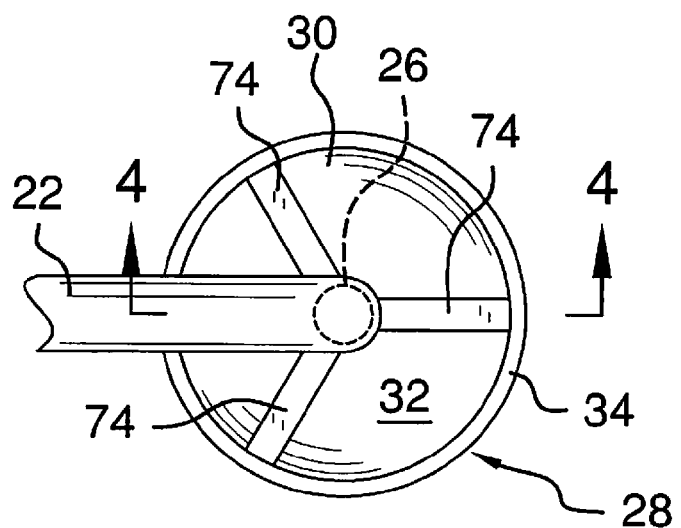
FIG. 3 is a top view of an embodiment of the disclosure.
Figure 5:
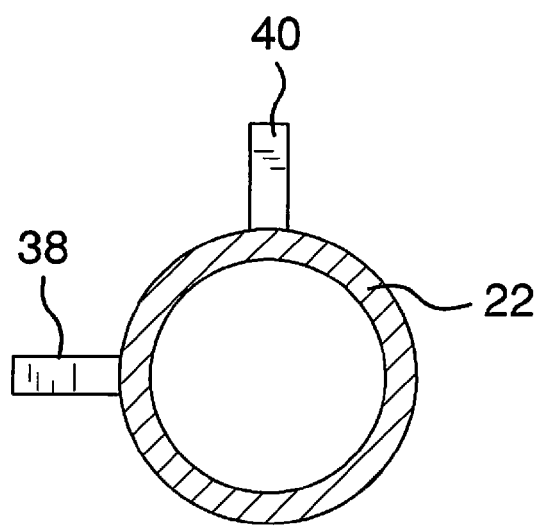
FIG. 5 is a partial cross-sectional view of an embodiment of the disclosure taken along line 5-5 of FIG. 3.
Figure 6:
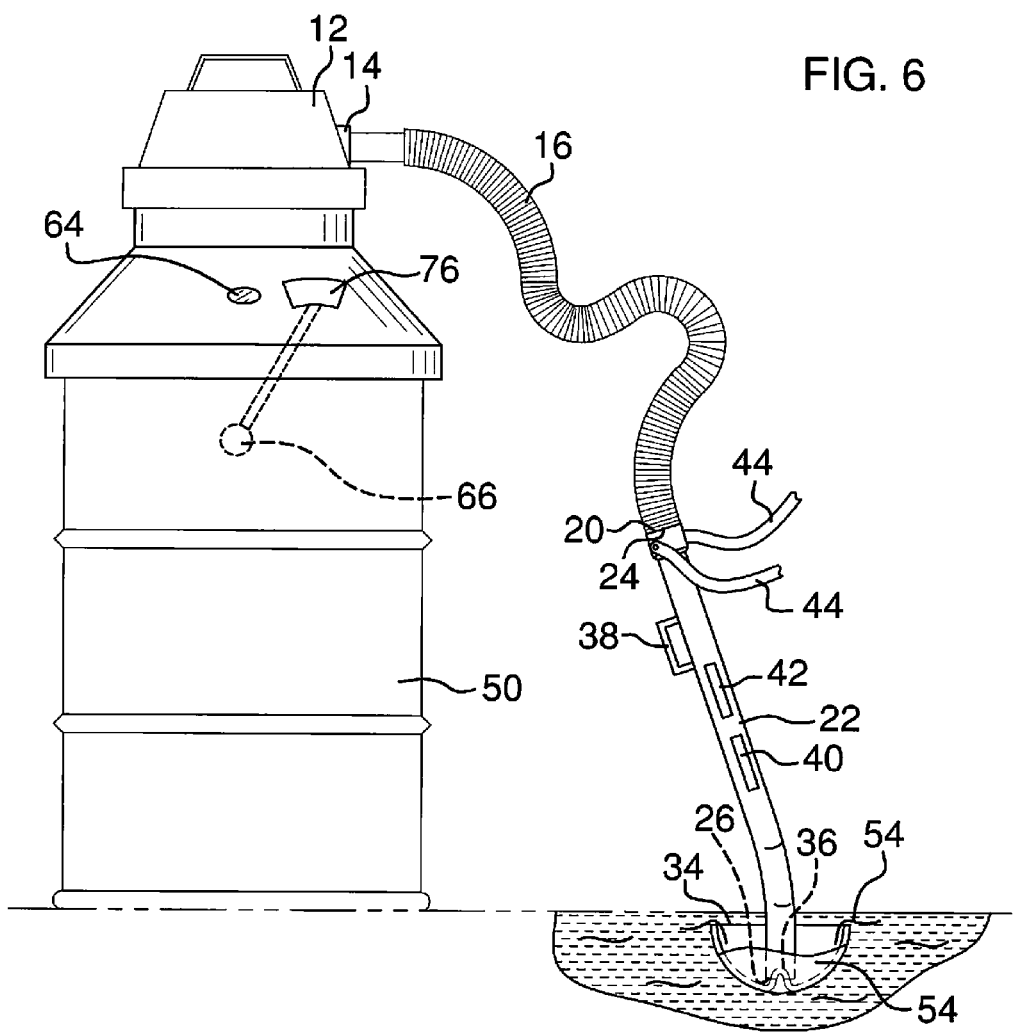
FIG. 6 is a side view of an embodiment of the disclosure in use.
Figure 7:
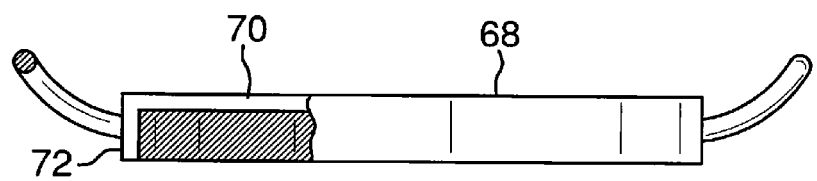
FIG. 7 is a partial cut-away view of a storage lid of an embodiment of the disclosure.

With reference now to the drawings, and in particular to FIGS. 1 through 7 thereof, a new oil collection device embodying the principles and concepts of an embodiment of the disclosure and generally designated by the reference numeral 10 will be described.

As best illustrated in FIGS. 1 through 7, the oil collection assembly 10 generally comprises a vacuum 12 having a suction port 14. A hose 16 has a first end 18 and a second end 20. The first end 18 of the hose 16 is coupled to the suction port 14. The hose 16 may be flexible and expandable longitudinally. An elongated nozzle 22 has a first end 24 and a second end 26. The first end 24 of the nozzle 22 is coupled to the second end 20 of the hose 16. A bowl 28 is coupled to the nozzle 22. The bowl 22 has a perimeter wall 30 extending around the second end 26 of the nozzle 22. The second end 26 of the nozzle 22 is positioned adjacent to an interior surface 32 of the perimeter wall 30 of the bowl 28. A top edge 34 of the perimeter wall 30 of the bowl 28 is positioned in vertically spaced relationship to the second end 26 of the nozzle 22 whereby the vacuum 12 is configured for sucking contents of the bowl 28 into the second end 26 of the nozzle 22. The interior surface 32 of the perimeter wall 30 of the bowl 28 forms a protrusion 36 extending into the second end 26 of the nozzle 22. A plurality of supports 74 extends between the interior surface 32 of the perimeter wall 30 of the bowl 28 and the nozzle 22 whereby the bowl 28 is coupled to the nozzle 22.

An upper handle 38 is coupled to the nozzle 22. A lower handle 40 is also coupled to the nozzle 22 in spaced relationship to the upper handle 38. The lower handle 40 extends transversely from the nozzle 22 relative to the upper handle 38. A supplemental handle 42 may be coupled to the nozzle 22. The supplemental handle 42 is positioned in spaced relationship to and coplanar with the lower handle 40. A strap 44 has first and second ends 46,48 coupled to the nozzle 22 whereby the strap 44 is configured for facilitating carrying and manipulation of the nozzle 22 by a person.

A collection barrel 50 is provided. The collection barrel 50 may be a conventional 55 gallon drum barrel or other similar container having an open top end 52. The vacuum 12 is coupled to the collection barrel 50 whereby the collection barrel 50 is configured to receive oil 54 sucked through the nozzle 22 by the vacuum 12. A collection lid 56 is provided having an open bottom end 60 coupled to the open top end 52 of the collection barrel 50. The collection lid 56 has an open top end 62 coupled to the vacuum 12. A transparent panel 64 may be coupled to the collection lid 56 to permit visual inspection of progress in filling the collection barrel 50. A fill gauge 76 may also be coupled to and positioned in the collection lid 56. A float 66 is mechanically coupled to and extends from the fill gauge 76. The float 66 extends beneath the open bottom end 60 of the collection lid 56 whereby the float 66 is configured to measure a level of oil 54 collected in the collection barrel 50. A storage lid 68 has a closed panel 70 and a peripheral wall 72 extending from the closed panel 70. The peripheral wall 72 engages the top 52 of the collection barrel 50 whereby the storage lid 68 is coupled to and closes the collection barrel 50.

In use, the nozzle 22 is manipulated to position the bowl 28 in a body of contaminated water such that the top edge 34 of the bowl 28 is positioned between a top surface of the water and a top surface of the oil 54 whereby the oil 54 is drawn into the bowl 28. The oil 54 collected into the bowl 28 is then drawn by gravity to a bottom 80 of the bowl around the protrusion 36. The vacuum 12 then draws the oil 54 through the second end 26 of the nozzle 22 where it is deposited into the collection barrel 50. When the collection barrel is filled, as indicated by either or both of the transparent panel 64 and the fill gauge 76, the collection lid 56 may be replaced with the storage lid 68.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An oil collection assembly comprising:
    a vacuum having a suction port;
    a hose having a first end and a second end, said first end of said hose being coupled to said suction port;
    a nozzle having a first end and a second end, said first end of said nozzle being coupled to said second end of said hose; and
    a bowl coupled to said nozzle, said bowl having a perimeter wall extending around said second end of said nozzle, said second end of said nozzle being positioned adjacent to an interior surface of said perimeter wall of said bowl, a top edge of said perimeter wall of said bowl being positioned in vertically spaced relationship to said second end of said nozzle whereby said vacuum is configured for sucking contents of said bowl into said second end of said nozzle, said interior surface of said perimeter wall of said bowl forming a protrusion extending into said second end of said nozzle.

2. The assembly of claim 1, further including an upper handle coupled to said nozzle.

3. The assembly of claim 2, further including a lower handle coupled to said nozzle, said lower handle extending transversely from said nozzle relative to said upper handle.

4. The assembly of claim 3, further including a supplemental handle coupled to said nozzle, said supplemental handle being positioned in spaced relationship to and coplanar with said lower handle.

5. The assembly of claim 1, further including a strap having first and second ends coupled to said nozzle.

6. The assembly of claim 1, further including a collection barrel, said vacuum being coupled to said collection barrel whereby said collection barrel is configured to receive oil sucked through said nozzle by said vacuum.

7. The assembly of claim 6, further including a collection lid having an open bottom end coupled to said collection barrel, said collection lid having an open top end coupled to said vacuum.

8. The assembly of claim 7, further including a transparent panel coupled to said collection lid.

9. The assembly of claim 7, further comprising:
    a fill gauge coupled to and positioned in said collection lid; and
    a float mechanically coupled to and extending from said fill gauge, said float extending beneath said open bottom end of said collection lid whereby said float is configured to measure a level of oil collected in said collection barrel.

10. The assembly of claim 6, further including a storage lid, said storage lid having a closed panel and a peripheral wall extending from said closed panel, said peripheral wall engaging a top of said collection barrel whereby said storage lid is coupled to and closes said collection barrel.

11. The assembly of claim 1, further including a plurality of supports extending between said interior surface of said perimeter wall of said bowl and said nozzle whereby said bowl is coupled to said nozzle.

12. An oil collection assembly comprising:
    a vacuum having a suction port;
    a hose having a first end and a second end, said first end of said hose being coupled to said suction port;
    a nozzle having a first end and a second end, said first end of said nozzle being coupled to said second end of said hose;
    a bowl coupled to said nozzle, said bowl having a perimeter wall extending around said second end of said nozzle, said second end of said nozzle being positioned adjacent to an interior surface of said perimeter wall of said bowl, a top edge of said perimeter wall of said bowl being positioned in vertically spaced relationship to said second end of said nozzle whereby said vacuum is configured for sucking contents of said bowl into said second end of said nozzle, said interior surface of said perimeter wall of said bowl forming a protrusion extending into said second end of said nozzle;
    an upper handle coupled to said nozzle;
    a lower handle coupled to said nozzle, said lower handle extending transversely from said nozzle relative to said upper handle;
    a supplemental handle coupled to said nozzle, said supplemental handle being positioned in spaced relationship to and coplanar with said lower handle;
    a strap having first and second ends coupled to said nozzle whereby said strap is configured for facilitating carrying of said nozzle by a person;
    a collection barrel, said vacuum being coupled to said collection barrel whereby said collection barrel is configured to receive oil sucked through said nozzle by said vacuum;
    a collection lid having an open bottom end coupled to said collection barrel, said collection lid having an open top end coupled to said vacuum;
    a transparent panel coupled to said collection lid;
    a fill gauge coupled to and positioned in said collection lid;
    a float mechanically coupled to and extending from said fill gauge, said float extending beneath said open bottom end of said collection lid whereby said float is configured to measure a level of oil collected in said collection barrel;
    a storage lid, said storage lid having a closed panel and a peripheral wall extending from said closed panel, said peripheral wall engaging a top of said collection barrel whereby said storage lid is coupled to and closes said collection barrel; and
    a plurality of supports extending between said interior surface of said perimeter wall of said bowl and said nozzle whereby said bowl is coupled to said nozzle.

* * * * *